US010375048B2

United States Patent
Wang et al.

(10) Patent No.: US 10,375,048 B2
(45) Date of Patent: Aug. 6, 2019

(54) USER IDENTITY VERIFICATION METHOD AND SYSTEM, AND VERIFICATION SERVER

(71) Applicant: Alibaba Group Holding Limited, Grand Cayman (KY)

(72) Inventors: Xiaofeng Wang, Hangzhou (CN); Hui Dong, Hangzhou (CN); Yang Yu, Hangzhou (CN); Daocheng Xie, Hangzhou (CN); Weiqin Wan, Hangzhou (CN); Lizhong Li, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 175 days.

(21) Appl. No.: 15/220,826

(22) Filed: Jul. 27, 2016

(65) Prior Publication Data

US 2017/0034147 A1    Feb. 2, 2017

(30) Foreign Application Priority Data

Jul. 27, 2015 (CN) .......................... 2015 1 0447170

(51) Int. Cl.
G06F 21/31    (2013.01)
H04L 29/06    (2006.01)

(52) U.S. Cl.
CPC ............ *H04L 63/08* (2013.01); *G06F 21/313* (2013.01); *H04L 63/18* (2013.01)

(58) Field of Classification Search
CPC .................................. H04L 63/08; H04L 63/18
(Continued)

(56) References Cited

U.S. PATENT DOCUMENTS 7,392,388 B2    6/2008  Keech
2004/0174965 A1    9/2004  Brahm et al.
(Continued)

FOREIGN PATENT DOCUMENTS

CN    103716332    4/2014
CN    104050741    9/2014

OTHER PUBLICATIONS

PCT Search Report and Written Opinion dated Oct. 7, 2016 for PCT application No. PCT/US2016/044202, 10 pages.
(Continued)

*Primary Examiner* — Jason K Gee
*Assistant Examiner* — Angela R Holmes
(74) *Attorney, Agent, or Firm* — Lee & Hayes, P.C.

(57) ABSTRACT

A user identity verification method is disclosed. The method includes receiving an identity verification request sent by a user through a client terminal; determining a user communication number according to the identity verification request and generating a corresponding temporary communication number for the user communication number; recording the user communication number and the temporary communication number as first data; returning the temporary communication number to the client terminal; receiving a call request initiated by the user to the temporary communication number; determining a respective user communication number and a respective temporary communication number corresponding to the call request as second data; verifying whether the first data matches with the second data; and returning a verification result to the client terminal. The method can improve security and reliability of identity verification, reduce a user's waiting time, and enhance user experience.

20 Claims, 4 Drawing Sheets

(58) Field of Classification Search
USPC .............................................................. 726/7
See application file for complete search history.

(56) References Cited

U.S. PATENT DOCUMENTS

| | | |
|---|---|---|
| 2007/0027803 A1 | 2/2007 | Brandes et al. |
| 2007/0220275 A1 | 9/2007 | Heitzeberg et al. |
| 2008/0255992 A1 | 10/2008 | Lin |
| 2009/0305667 A1 | 12/2009 | Schultz |
| 2011/0016050 A1 | 1/2011 | Evans |
| 2013/0291089 A1 | 10/2013 | Wang et al. |
| 2013/0322612 A1 | 12/2013 | Petrack et al. |
| 2014/0010357 A1 | 1/2014 | Krishnan et al. |
| 2015/0206126 A1 | 7/2015 | Zeinecker |
| 2015/0347857 A1 | 12/2015 | Li |
| 2015/0350224 A1 | 12/2015 | Li |

OTHER PUBLICATIONS

Chinese Office Action for Application No. 201510447170.9, dated Nov. 22, 2018, 6 pages.

USER IDENTITY VERIFICATION METHOD AND SYSTEM, AND VERIFICATION SERVER

CROSS REFERENCE TO RELATED PATENT APPLICATION

This application claims foreign priority to Chinese Patent Application No. 201510447170.9 filed on Jul. 27, 2015, entitled "User Identity Verification Method and System, and Verification Server", which is hereby incorporated by reference in its entirety.

TECHNICAL FIELD

The present disclosure relates to the Internet field, and in particular, to user identity verification methods and systems, and verification servers.

BACKGROUND

With the continuous development of Internet technologies, an increasing number of users can conduct interactive activities or obtain services via the Internet. Under many circumstances, an identity of a user needs to be verified in situations in which the user conducts an Internet or mobile Internet activity, such as in scenarios of registration, login, etc. At present, a verification method primarily includes performing verification using a short message verification code. This method includes sending a short message verification code to a mobile phone number provided by a user who inputs the short message verification code in a corresponding position according to a prompt. A background server may then verify whether the short message verification code entered by the user is consistent with the short message verification code previously sent to the user, and verification is passed if they are consistent. However, short message verification codes are easily intercepted by a third party or Trojan during transmission or after arriving at mobile phones, the security thereof is relatively low. Furthermore, as an arrival rate of short messages cannot be guaranteed, a success rate of identity verification cannot reach an ideal value, thus affecting user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure aims to resolve technical problems in existing technologies. Accordingly, an objective of the present disclosure is to provide a user identity verification method, which can improve security and reliability of identity verification, reduce waiting times of users, and enhance user experience. A second objective of the present disclosure is to provide a verification server. A third objective of the present disclosure is to provide a user identity verification system.

In order to achieve the above objectives, an example user identity verification method according to a first aspect of the present disclosure may include receiving an identity verification request sent by a user through a client terminal; determining a user communication number according to the identity verification request, and generating a corresponding temporary communication number for the user communication number; recording the user communication number and the temporary communication number as first data; returning the temporary communication number to the client terminal; receiving a call request for the temporary communication number initiated by the user; determining a corresponding user communication number and a corresponding temporary communication number of the call request as second data; verifying whether the first data matches with the second data; and returning an verification result to the client terminal.

According to the example user identity verification method, first data made up of a user communication number and a temporary communication number may be generated according to an identity verification request sent from a client terminal, and the temporary communication number may be returned to the client terminal. In response to a call request for the temporary communication number initiated by a user, verification may be performed based on whether second data made up of a user communication number and a temporary communication number which correspond to the call request matches with the first data. The method can initiate a call to a temporary communication number allocated by a verification server from a user communication number, so that identity verification can be performed for the user through a voice channel between the user and the verification server. Therefore, security and reliability of the identity verification can be improved, and a waiting time of the user is reduced, thus enhancing user experience.

In order to achieve the above objectives, an example verification server according to a second aspect of the present disclosure may include an verification request receiving module used for receiving an identity verification request sent by a user through a client terminal; a determination module used for determining a user communication number according to the identity verification request; a generation module used for generating a corresponding temporary communication number for the user communication number, and recording the user communication number and the temporary communication number as first data; a first returning module used for returning the temporary communication number to the client terminal; a call request receiving module for receiving a call request initiated by the user to the temporary communication number; a verification module used for determining a respective user communication number and a respective temporary communication number corresponding to the call request as second data, and verifying whether the first data matches with the second data; and a second returning module used for returning a verification result to the client terminal.

According to the example verification server of the present disclosure, first data made up of a user communication number and a temporary communication number may be generated according to an identity verification request sent from a client terminal, and the temporary communication number may be returned to the client terminal. In response to a call request for the temporary communication number initiated by a user, verification may be performed based on whether second data made up of a user communication number and a temporary communication number which correspond to the call request matches with the first data. The method can initiate a call to a temporary communication number allocated by a verification server from a user communication number, so that identity verification can be performed for the user through a voice channel between the user and the verification server. Therefore, security and reliability of the identity verification can be improved, and a waiting time of the user is reduced, thus enhancing user experience.

In order to achieve the above objectives, an example user identity verification system according to a third aspect of the present disclosure may include a client terminal and the verification server according to the second aspect of the present disclosure.

According to the example user identity verification system of the present disclosure, the verification server may generate first data made up of a user communication number and a temporary communication number according to an identity verification request sent by a client terminal, and return the temporary communication number to the client terminal. In response to initiating a call request for the temporary communication number initiated by a user, verification may be performed whether second data made up of a user communication number and a temporary communication number which correspond to the call request matches with the first data. The method can initiate a call to a temporary communication number allocated by the verification server from a user communication number, so that identity verification can be performed for the user through a voice channel between the user and the verification server. Therefore, security and reliability of the identity verification can be improved, and a waiting time of the user is reduced, thus enhancing user experience.

Advantages of additional aspects of the present disclosure will be partially set forth in the following description, which will be made apparent from the following description, or may be understood through implementations of the present disclosure.

DETAILED DESCRIPTION

Exemplary embodiments of the present disclosure are described in detail hereinafter, and examples of the embodiments are illustrated in accompanying drawings, where the same or similar signs represent the same or similar elements or elements having the same or similar functions. The following embodiments described with reference to the accompanying drawings are exemplary, being used only for explaining the present disclosure, and thus should not be construed as limitations to the present disclosure.

A method, a system, a terminal, a verification server and a support server for user identity verification according to the embodiments of the present disclosure are described hereinafter with reference to the accompanying drawings.

Figure 1:
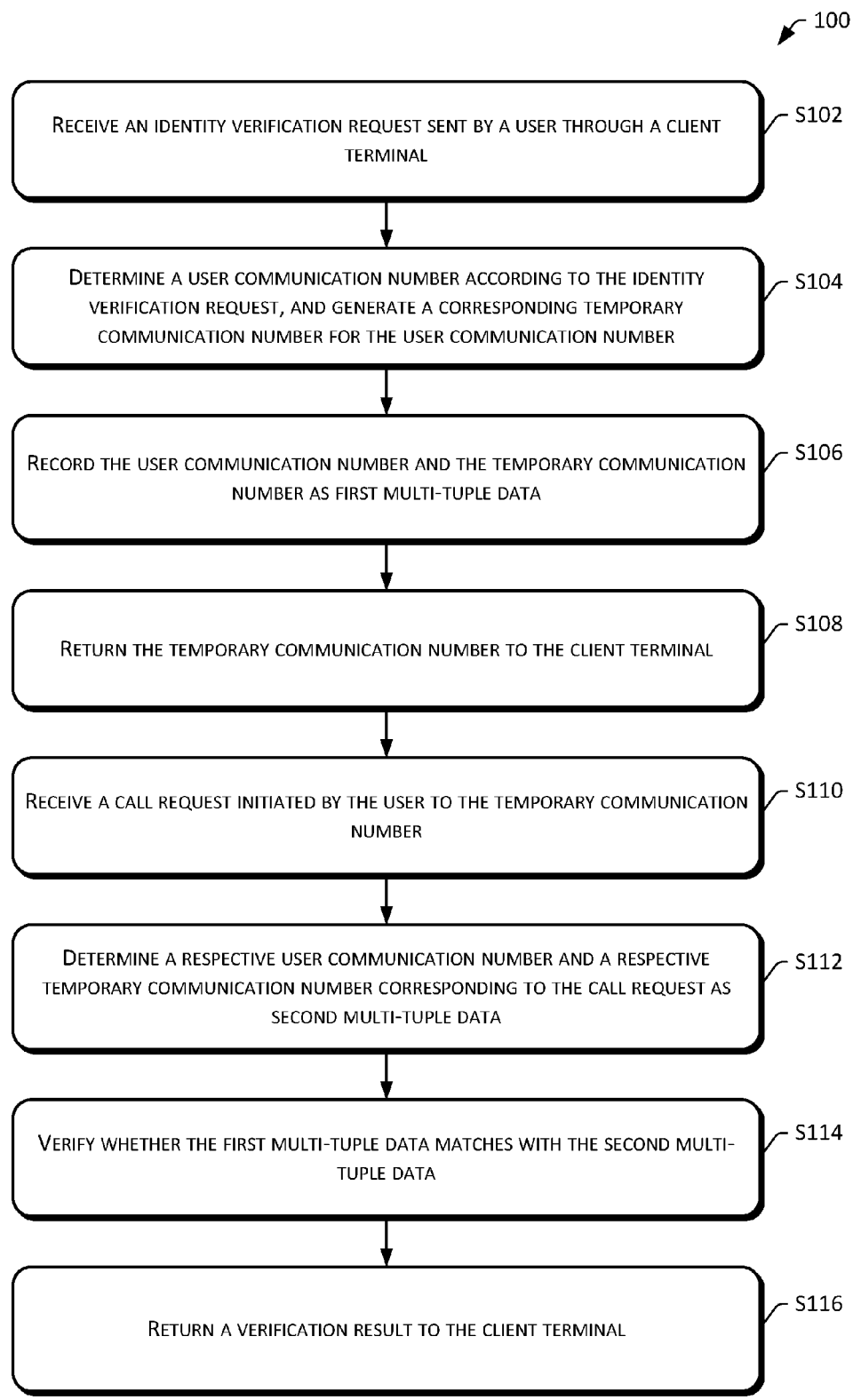
FIG. 1 is a flowchart of a user identity verification method according to an embodiment of the present disclosure.

FIG. 1 is a flowchart of a user identity verification method 100 according to an embodiment of the present disclosure.

It should be understood that the user identity verification method in the present embodiment may be performed by a verification server.

As shown in FIG. 1, the user identity verification method 100 may include the following operations.

S102 receives an identity verification request sent by a user through a client terminal.

When a user registers or logs in through a client terminal, an identity of the user needs to be verified. At this point, the user may send an identity verification request to a verification server through the client terminal. In implementations, the client terminal may provide a registration or login interface, with the interface including a registration or login button. After the user clicks the button, the client terminal sends an identity verification request to the verification server.

In implementations, the client terminal may include a WEB page terminal, an APP terminal, a WAP page terminal or the like.

S104 determines a user communication number according to the identity verification request, and generates a corresponding temporary communication number for the user communication number.

In implementations, if the identity verification request is sent when the user registers a new account, the identity verification request further includes a user communication number. The user communication number is inputted when the user submits the identity verification request. In implementations, when the user registers a new account and identity verification thereof needs to be performed, the client terminal may provide an input box or an input region in a registration interface and instruct the user to input a user communication number. After the user inputs the communication number and clicks a registration button, the client terminal may send the identity verification request including the user communication number to the verification server. Upon receiving the identity verification request, the verification server may obtain the user communication number therein.

In implementations, if the user is a registered user, the identity verification request may include account information of the registered user. Determining the user communication number according to the identity verification request may include determining a corresponding user communication number according to the account information of the registered user. In implementations, since the user may have submitted a user communication number corresponding to registered account information (a username, a user ID and the like) during registration, the verification server may store the user communication number and the registered account information correspondingly in a user information library. Therefore, when the user uses a specific service (for example, login, payment, transfer, etc.) that needs to verify an identity of the user, the verification server may determine corresponding account information of the user according to the identity verification request and search for a corresponding user communication number from the stored user information library.

After the user communication number is determined, the verification server may generate a corresponding temporary communication number for the user communication number. The temporary communication number may include a mobile phone number, a special service number, a landline telephone number, a network telephone number, etc. The verification server may apply for communication numbers in one or more segments in advance from service providers (mobile communication service providers such as Mobile, Unicom, Telecom, etc.). After the user communication number is determined, a communication number is randomly selected from the applied communication numbers as a corresponding temporary communication number.

In implementations, after a communication number is selected as a temporary communication number, this communication number cannot be used as a temporary communication number corresponding to the user communication number in other verification processes any more. In additional implementations, a temporary communication number may also be allocated according to another allocation rule. For example, a same temporary communication number may be allocated to user communication numbers for identity verification requests initiated from a same client terminal having an identifier according to the identifier of the client terminal. The present disclosure does not impose any limitation on details of a rule of allocating a verification number.

S106 records the user communication number and the temporary communication number as first multi-tuple data.

In implementations, the first multi-tuple data may include two-tuple data including the user communication number and the temporary communication number.

In additional implementations, the identity verification request may further include a client terminal identifier, and the first multi-tuple data may be generated based on the user communication number, the client terminal identifier and the temporary communication number.

For example, three-tuple data may be in a form of AX or AXB, where A is a user communication number, X is a temporary communication number, and B is a client terminal identifier.

It should be understood that the temporary communication number is allocated for the user communication number, and thus only the user communication number can initiate a call to the temporary communication number.

S108 returns the temporary communication number to the client terminal.

In implementations, the identity verification request may further include a client terminal identifier, and S108 may include returning the temporary communication number to a client terminal corresponding to the client terminal identifier. Thus, the temporary communication number can be accurately returned to the corresponding client terminal, thereby improving the accuracy of the verification.

S110 receives a call request initiated by the user to the temporary communication number.

In implementations, after the client terminal receives the temporary communication number, the temporary communication number may be displayed to the user, and the user may prompted to initiate a call to the temporary communication number. After receiving the prompt, the user may initiate a call to the temporary communication number via a mobile telephone, a landline telephone or an application program having a voice communication function.

In implementations, the client terminal may display the temporary communication number in a form of a two-dimensional code. The user may use a mobile terminal to initiate a call to the temporary communication number by scanning and parsing the two-dimensional code. Apparently, the client terminal may also display the temporary communication number in another manner, which is not limited in the present disclosure. For example, the temporary communication number may be displayed via a bar code, a pattern, etc.

S112 determines a respective user communication number and a respective temporary communication number corresponding to the call request as second multi-tuple data.

S114 verifies whether the first multi-tuple data matches with the second multi-tuple data.

After receiving the call request initiated by the user, the verification server may determine a user communication number (a communication number of a calling party) and a temporary communication number (a communication number of a called party), and generate second multi-tuple data. Verification may then be performed as to whether the recorded first multi-tuple data matches with the second multi-tuple data.

If the first multi-tuple data does not match with the second multi-tuple data, the verification of the user is determined to be failed. Thus, an identity of the user can be verified based on whether the received call request is an identity verification request using a call from the corresponding user communication number to the temporary communication number. Compared with the method of performing verification using a short message verification code, a user communication number is extremely difficult to be counterfeited in this method of initiating a call through a user communication number, and thus the security of verification is higher.

If the first multi-tuple data matches with the second multi-tuple data, a prompt audio message is further played to the user, and information inputted by the user according to the prompt audio message is received. Verification is performed as to whether the inputted information is consistent with the content of the prompt audio message. If the inputted information is consistent with the content of the prompt audio message, the verification succeeds. Otherwise, the verification fails. In implementations, the prompt audio message instructs the user to input a specified key, numerical string or character string.

Furthermore, the verification server may select content of a prompt audio message to be played according to a security level of the verification. For example, if the security level of the verification is a low level, the verification server may play a default prompt audio message, and the verification succeeds after the default prompt audio message is played completely. If the security level of the verification is a middle level, the verification server may instruct the user to press a corresponding key. If the security level of the verification is a high level, the verification server may instruct the user to input a corresponding numerical string or character string. After the user inputs the numerical string or character string, verification is performed to determine whether information inputted by the user is consistent with the content of the prompt audio message. If affirmative, the verification is passed. Otherwise, the verification fails.

A security level may be set by the verification server according to an identity of a user corresponding to an identity verification request. For example, if the user is in a normal state, a low-level verification may be selected. If the user is in an abnormal state (for example, a remote login, etc.), a mid-level verification may be selected. If the user is flagged, a high-level verification may be selected.

In implementations, the verification server may also carry out verification according to the time at which a user initiates a call request. In implementations, the method may further include verifying whether a time difference between a time of initiating the call request and a time of generating the first multi-tuple data is less than a preset time; and determining that the user verification fails if the time difference is greater than or equal to the preset time; or sending a prompt audio message to perform additional verification otherwise.

S116 returns a verification result to the client terminal.

In implementations, a verification result may be returned to a corresponding client terminal according to the client terminal identifier in the identity verification request. Thus, the verification result can be accurately returned to the corresponding client terminal, thereby improving the accuracy of the verification.

In additional implementations, other different verification rules may be set up in advance for different client terminals. Therefore, after receiving a call request, the verification server may select a corresponding verification rule to carry out verification according to a client terminal identifier. Thus, corresponding verification rules may be selected for performing verification according to requirements of different client terminals, thus further enhancing the security and the accuracy of the verification.

According to the example user identity verification method, first multi-tuple data made up of a user communication number and a temporary communication number may be generated according to an identity verification request sent from a client terminal, and the temporary communication number may be returned to the client terminal. In response to a call request for the temporary communication number initiated by a user, verification may be performed based on whether second multi-tuple data made up of a user communication number and a temporary communication number which correspond to the call request matches with the first multi-tuple data. The method can initiate a call to a temporary communication number allocated by a verification server from a user communication number, so that identity verification can be performed for the user through a voice channel between the user and the verification server. Therefore, security and reliability of the identity verification can be improved, and a waiting time of the user is reduced, thus enhancing user experience.

In order to implement the foregoing embodiments, the present disclosure provides a verification server.

Figure 2:
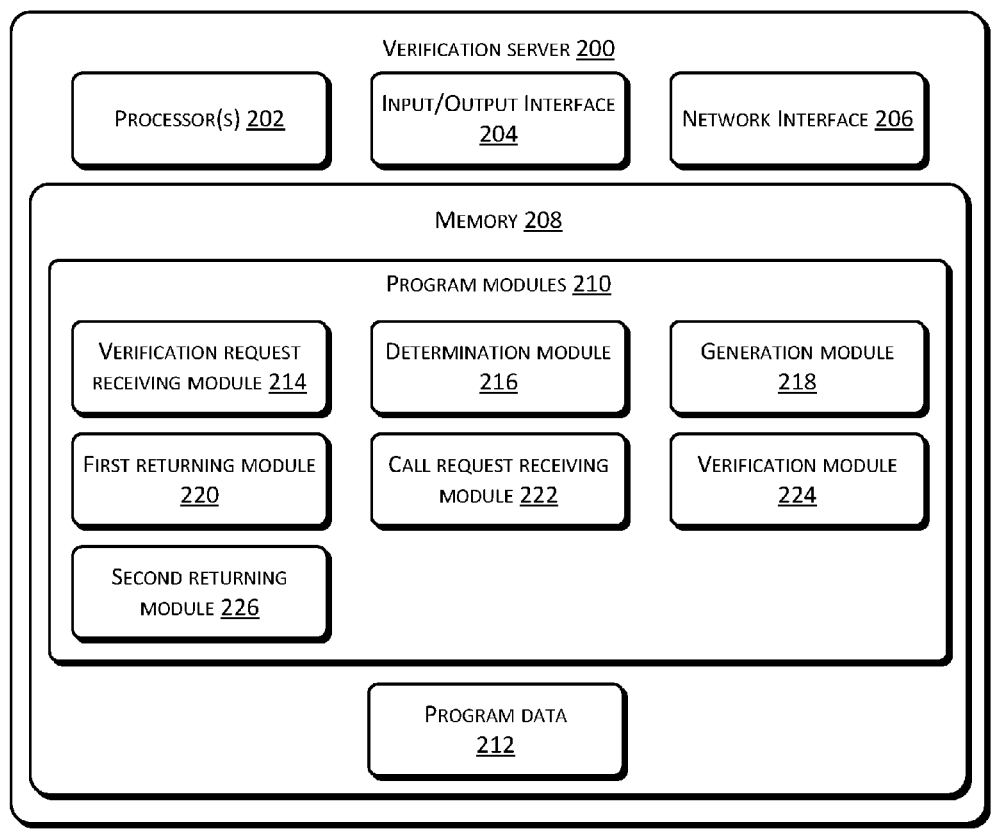
FIG. 2 is a schematic structural diagram of a verification server according to an embodiment of the present disclosure.

FIG. 2 is a schematic structural diagram of a verification server 200 according to an embodiment of the present disclosure.

As shown in FIG. 2, the verification server 200 may include one or more processors 202, an input/output (I/O) interface 204, a network interface 206 and memory 208.

The memory 208 may include a form of computer-readable media, e.g., a non-permanent storage device, random-access memory (RAM) and/or a nonvolatile internal storage, such as read-only memory (ROM) or flash RAM. The memory 208 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 208 may include program modules 210 and program data 212. The program modules 210 may include a verification request receiving module 214, a determination module 216, a generation module 218, a first returning module 220, a call request receiving module 222, a verification module 224, and a second returning module 226.

In implementations, the verification request receiving module 214 may receive an identity verification request sent by a user through a client terminal.

When a user registers or logs in through a client terminal, an identity of the user needs to be verified. At this point, the user may send an identity verification request to a verification server 200 through the client terminal. In implementations, the client terminal may provide a registration or login interface, with the interface including a registration or login button. After the user clicks the button, the client terminal sends an identity verification request to the verification request receiving module 214.

In implementations, the client terminal may include a WEB page terminal, an APP terminal, a WAP page terminal or the like.

The determination module 216 may determine a user communication number according to the identity verification request.

In implementations, if the identity verification request is sent when the user registers a new account, the identity verification request further includes a user communication number. The user communication number is inputted when the user submits the identity verification request. In implementations, when the user registers a new account and identity verification thereof needs to be performed, the client terminal may provide an input box or an input region in a registration interface and instruct the user to input a user communication number. After the user inputs the communication number and clicks a registration button, the client terminal may send the identity verification request including the user communication number to the verification server 200. After the verification request receiving module 214 receives the identity verification request, the determination module 216 may determine a user communication number from the identity verification request.

In implementations, if the user is a registered user, the identity verification request may include account information of the registered user. Determining the user communication number according to the identity verification request may include determining a corresponding user communication number according to the account information of the registered user. In implementations, since the user may have submitted a user communication number corresponding to registered account information (a username, a user ID and the like) during registration, the verification server 200 may store the user communication number and the registered account information correspondingly in a user information library. Therefore, when the user uses a specific service (for example, login, payment, transfer, etc.) that needs to verify an identity of the user, the determination module 216 may determine corresponding account information of the user according to the identity verification request and search for a corresponding user communication number from the stored user information library.

The generation module 218 may generate a corresponding temporary communication number for the user communication number, and record the user communication number and the temporary communication number as first multi-tuple data.

After the determination module 216 determines the user communication number, the generation module 218 may generate a corresponding temporary communication number for the user communication number. The temporary communication number may include a mobile phone number, a special service number, a landline telephone number, a network telephone number, etc. The verification server 200 may apply for communication numbers in one or more segments from service providers (for example, mobile communication service providers such as Mobile, Unicom, Telecom, etc.) in advance. After the user communication number is determined, the generation module 218 may randomly select a communication number from the applied communication numbers as a corresponding temporary communication number.

In implementations, after a communication number is selected as a temporary communication number, this communication number cannot be used as a temporary communication number corresponding to the user communication number in other verification processes any more. In additional implementations, a temporary communication number may also be allocated according to another allocation rule. For example, a same temporary communication number may be allocated to user communication numbers for identity verification requests initiated from a same client terminal having an identifier according to the identifier of the client terminal. The present disclosure does not impose any limitation on details of a rule of allocating a verification number.

In implementations, the first multi-tuple data may include two-tuple data including the user communication number and the temporary communication number.

In implementations, the identity verification request may further include a client terminal identifier. The generation module 218 may generate the first multi-tuple data based on the user communication number, the client terminal identifier and the temporary communication number.

For example, three-tuple data may be in a form of AX or AXB, where A is a user communication number, X is a temporary communication number, and B is a client terminal identifier.

It should be understood that the temporary communication number is allocated for the user communication number, and thus only the user communication number can initiate a call to the temporary communication number.

The first returning module 220 may return the temporary communication number to the client terminal.

In implementations of the present disclosure, the identity verification request may further include a client terminal identifier. The first returning module 220 may return the temporary communication number to a client terminal corresponding to the client terminal identifier. Thus, the temporary communication number can be accurately returned to the corresponding client terminal, thereby improving the accuracy of the verification.

The call request receiving module 222 may receive a call request to the temporary communication number initiated by the user.

In implementations, after the client terminal receives the temporary communication number, the temporary communication number may be displayed to the user, and the user may prompted to initiate a call to the temporary communication number. After receiving the prompt, the user may initiate a call to the temporary communication number via a mobile telephone, a landline telephone or an application program having a voice communication function. At this point, the call request receiving module 222 may receive the call request.

In implementations, the client terminal may display the temporary communication number in a form of a two-dimensional code. The user may use a mobile terminal to initiate a call to the temporary communication number by scanning and parsing the two-dimensional code. Apparently, the client terminal may also display the temporary communication number in another manner, which is not limited in the present disclosure. For example, the temporary communication number may be displayed via a bar code, a pattern, etc.

The verification module 224 may determine a respective user communication number and a respective temporary communication number corresponding to the call request as second multi-tuple data, and verify whether the first multi-tuple data matches with the second multi-tuple data.

After the call request receiving module 222 receives the call request initiated by the user, the verification module 224 may determine a respective user communication number (a communication number of a calling party) and a respective temporary communication number (a communication number of a called party), and generate second multi-tuple data. Verification may then be performed as to whether the recorded first multi-tuple data matches with the second multi-tuple data.

If the first multi-tuple data does not match with the second multi-tuple data, the verification module 224 determines that the verification of the user fails. Thus, an identity of the user can be verified based on whether the received call request is an identity verification request using a call from the corresponding user communication number to the temporary communication number. Compared with the method of performing verification using a short message verification code, a user communication number is extremely difficult to be counterfeited in this method of initiating a call through a user communication number, and thus the security of verification is higher.

If the first multi-tuple data matches with the second multi-tuple data, the verification module 224 may further play a prompt audio message to the user, receive information inputted by the user according to the prompt audio message, and verify whether the inputted information is consistent with content of the prompt audio message. If the inputted information is consistent with the content of the prompt audio message, the verification succeeds. Otherwise, the verification fails. In implementations, the prompt audio message instructs the user to input a specified key, numerical string or character string.

Furthermore, the verification module 224 may select content of a prompt audio message to be played according to a security level of the verification. For example, if the security level of the verification is a low level, the verification module 224 may play a default prompt audio message, and the verification succeeds after the default prompt audio message is played completely. If the security level of the verification is a middle level, the verification module 224 may instruct the user to press a corresponding key. If the security level of the verification is a high level, the verification module 224 may instruct the user to input a corresponding numerical string or character string. After the user inputs the numerical string or character string, verification is performed to determine whether information inputted by the user is consistent with the content of the prompt audio message. If affirmative, the verification is passed. Otherwise, the verification fails.

A security level may be set by the verification server according to an identity of a user corresponding to an identity verification request. For example, if a state associated with the user is normal, a low-level verification may be selected. If the state associated with the user is abnormal (e.g., a remote login, etc.), a mid-level verification may be selected. If the user is flagged, a high-level verification may be selected.

In implementations, the verification module 224 may also carry out verification according to the time at which a user initiates a call request. In implementations, the verification module 224 may further verify whether a time difference between a time of initiating the call request and a time of generating the first multi-tuple data is less than a preset time, and determine that the user verification fails if the time difference is greater than or equal to the preset time, or send a prompt audio message to perform additional verification otherwise.

The second returning module 226 may return a verification result to the client terminal.

In implementations, the second returning module 226 may return a verification result to a corresponding client terminal according to the client terminal identifier in the identity verification request. Thus, the verification result can be accurately returned to the corresponding client terminal, thereby improving the accuracy of the verification.

The example verification server 200 may generate first multi-tuple data that is made up of a user communication number and a temporary communication number according to an identity verification request sent from a client terminal, and return the temporary communication number to the client terminal. In response to a call request for the temporary communication number initiated by a user, verification may be performed based on whether second multi-tuple data made up of a user communication number and a temporary communication number which correspond to the call request matches with the first multi-tuple data. The method can initiate a call to a temporary communication number allocated by a verification server from a user communication number, so that identity verification can be performed for the user through a voice channel between the user and the verification server 200. Therefore, security and reliability of the identity verification can be improved, and a waiting time of the user is reduced, thus enhancing user experience.

It should be understood that, in implementations, the verification server 200 may be an integral entity, or may be divided into a client terminal server part corresponding to the client terminal and a support verification part for allocating a temporary user number. In implementations, using the embodiment shown in FIG. 2 as an example, the verification request receiving module 214, the determination module 216 and the first returning module 220 may belong to the client terminal server part, whereas the generation module 218, the call request receiving module 222, the verification module 224 and the second returning module 226 may belong to the support verification part.

Figure 3:
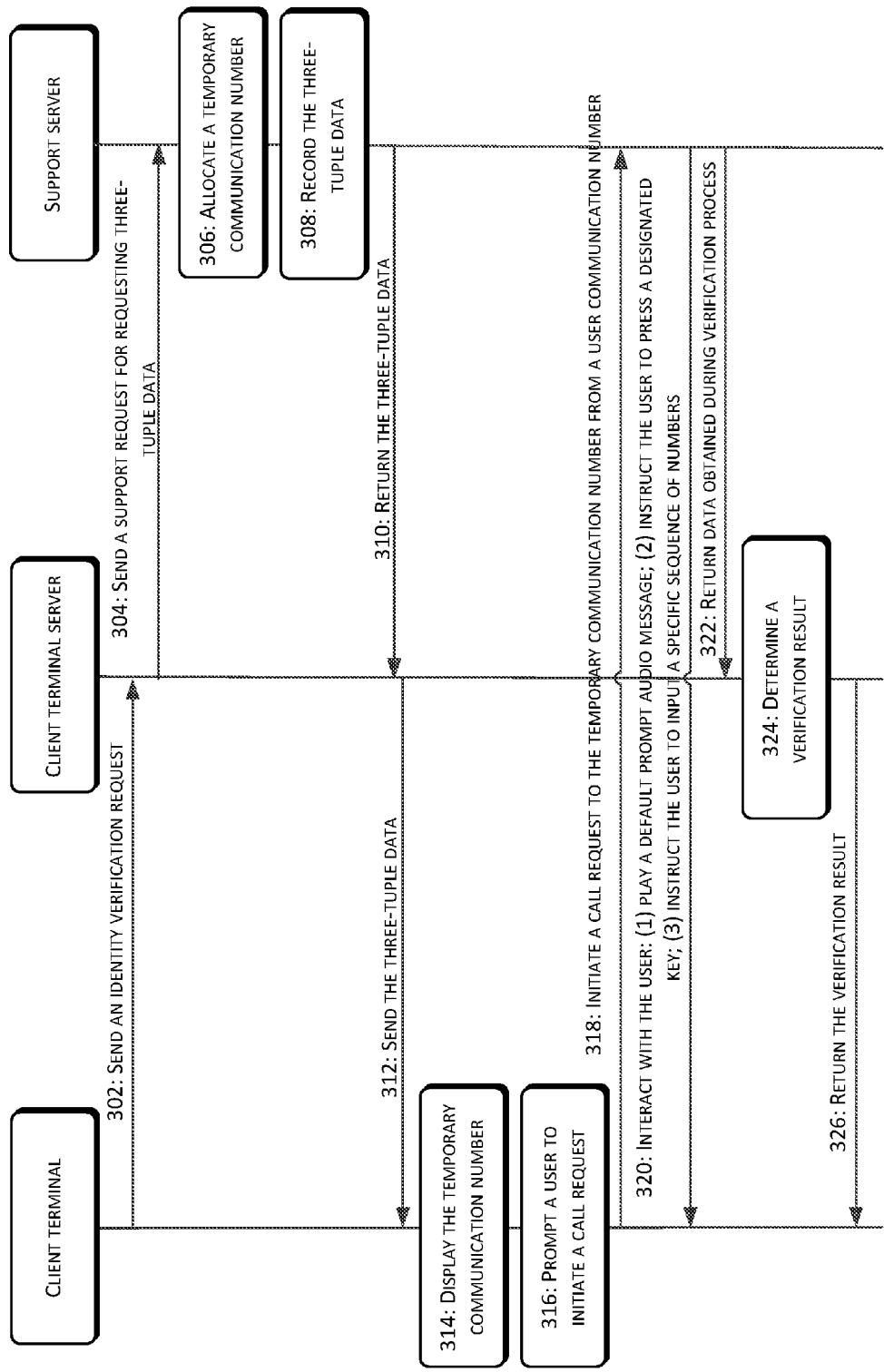
FIG. 3 is a sequence diagram of a user identity verification process according to an embodiment of the present disclosure.

In implementations, an example process of user identity verification according to an embodiment of the present disclosure is described below with reference to FIG. 3. FIG. 3 is a sequence diagram of a process 300 of user identity verification according to an embodiment of the present disclosure. In implementations, the verification server 200 may be divided into a client terminal server part corresponding to a client terminal and a support verification part (i.e., a support server) for allocating a temporary user number.

As shown in FIG. 3, the client terminal sends 302 an identity verification request to the client terminal server for a user. In response to receiving the identity verification request, the client terminal server sends 304 a support request to the support server to request three-tuple data (i.e., first multi-tuple data). In response to receiving the support request, the support server allocates 306 a temporary communication number for a user communication number corresponding to the support request, and records 308 three-tuple data which is made up of the user communication number, the temporary communication number and a client terminal identifier. The three-tuple data may have a particular period of validity (i.e., the aforementioned preset time), and the three-tuple data is invalid after the period of validity expires. The support server returns 310 the three-tuple data to the client terminal server, and the client terminal server sends 312 the temporary communication number in the three-tuple data to the client terminal. The client terminal displays 314 the temporary communication number, and prompts 316 the user to initiate a call request to the temporary communication number within the period of validity. The user may use his/her own user communication number to initiate 318 a call request to the displayed temporary communication number, with the call request reaching the support server to establish a connection with the support server through voice. The support server interacts 320 with the user differently according to a security level selected by the client terminal server (e.g., plays a default prompt audio message, instructs the user to press a designated key, and/or instructs the user to input a specific sequence of numbers and/or characters, etc.), and returns 322 data to the client terminal server during the verification process. The client terminal server determines 324 a verification result according to the returned data and returns 326 the verification result to the client terminal. In the foregoing process, the process 300 proceeds to an identity verification process if dialing to the temporary communication number is performed via the user communication number in the three-tuple data within the preset time, i.e., a corresponding identity verification process is performed according to the security level selected by the client terminal server. Otherwise, the verification fails. The support server may return data of interaction between the support server and the user (for example, a prompt audio message played by the support server, an operation fed back by the user, etc.) in the identity verification process 300 to the client terminal server. The client terminal server may determine whether the verification is passed according to whether the operation fed back by the user is consistent with the content of the prompt audio message, and send a verification result to the client terminal to notify the user.

In implementations, since the user actively dials the temporary communication number of this identity verification, a success rate of verification is greatly enhanced as compared to the existing method of performing verification using a short message verification code. The time period during which the user is waiting anxiously is reduced, thus improving user experience. In addition, as the degree of difficulty of counterfeiting a user communication number to make a call is very high, the security of the verification process in the present disclosure is greatly enhanced as compared to the existing verification method.

In order to achieve the foregoing embodiments, the present disclosure further provides a user identity verification system.

Figure 4:
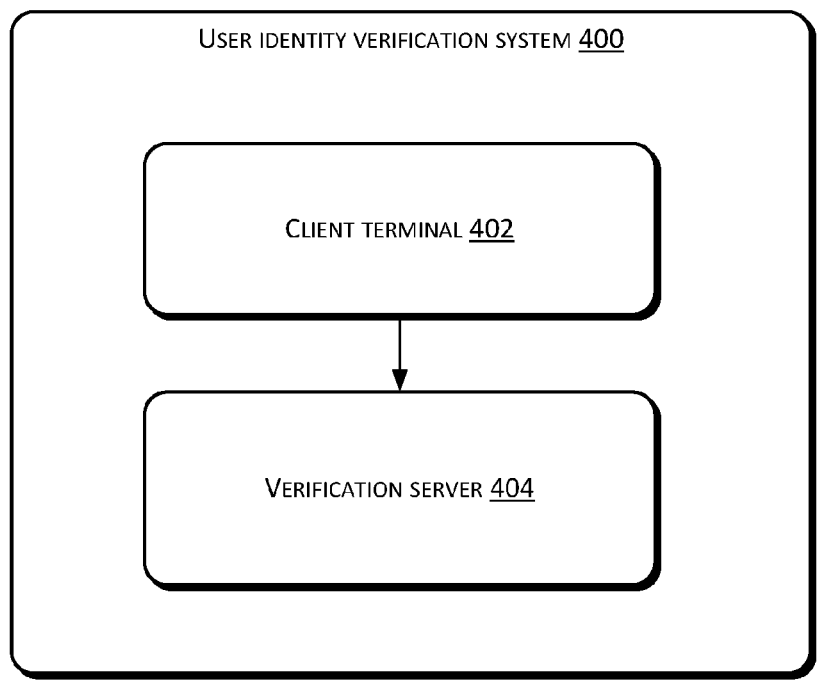
FIG. 4 is a schematic structural diagram of a user identity verification system according to an embodiment of the present disclosure.

FIG. 4 is a schematic structural diagram of a user identity verification system 400 according to an embodiment of the present disclosure.

As shown in FIG. 4, the user identity verification system 400 may include a client terminal 402 and a verification server 404.

The client terminal 402 may include a WEB page terminal, an APP terminal or a WAP page terminal.

The verification server 404 may include the verification server of any embodiment in the present disclosure.

According to the example user identity verification system of the present disclosure, the verification server may generate first multi-tuple data made up of a user communication number and a temporary communication number according to an identity verification request sent by a client terminal, and return the temporary communication number to the client terminal. In response to initiating a call request for the temporary communication number initiated by a user, verification may be performed whether second multi-tuple data made up of a user communication number and a temporary communication number which correspond to the call request matches with the first multi-tuple data. The method can initiate a call to a temporary communication number allocated by the verification server from a user communication number, so that identity verification can be performed for the user through a voice channel between the user and the verification server. Therefore, security and reliability of the identity verification can be improved, and a waiting time of the user is reduced, thus enhancing user experience.

In the description of the present disclosure, it should be understood that directional or positional relationships indicated by terms such as "center", "longitudinal", "transversal", "length", "width", "thickness", "upper", "lower", "front", "back", "left", "right", "vertical", "horizontal", "top", "bottom", "inner", "outer", "clockwise", "counterclockwise", "axial", "radial", "circumferential", etc., are directional or positional relationships as shown according to the accompanying drawings. These terms are merely intended to facilitate describing the present disclosure and simplify the description, rather than indicating or implying that an apparatus or element indicated thereby needs to have a particular direction, and to be constructed and operated in a particular direction. Thus, they cannot be construed as limitations to the present disclosure.

In addition, terms such as "first" and "second" are merely used for the purpose of description, but should not be understood as indicating or implying a relative importance or implicitly indicating a number of technical features indicated thereby. Thus, features defined with "first" and "second" may explicitly or implicitly include at least one of these features. In the description of the present disclosure, "multiple" means at least two, for example, two, three, etc., unless specifically defined otherwise.

In the present disclosure, unless specifically defined otherwise, terms such as "installed", "connected", "linked", "fixed", etc., should be understood in a broad sense. These terms may be a fixed connection, a removable connection or an integral entity, for example. Additionally or alternatively, these terms may be a mechanical connection or an electrical connection; a direct connection or a connection through an intermediate medium; an internal communication of two elements or an interactive relationship between two elements, unless specifically defined otherwise. One of ordinary skill in the art can understand the specific meaning of the above terms in the present disclosure according to specific situations.

In the present disclosure, unless specifically defined otherwise, a first feature being at an "upper" or "lower" position of a second feature may indicate that the first feature and the second feature are in direct contact, or the first feature and the second feature are in indirect contact through an intermediate medium. Moreover, a first feature being "above", "over" and "on" a second feature may indicate that the first feature is directly over or obliquely over the second feature, or may merely indicate that a horizontal height of the first feature is higher than that of the second feature. A first feature being "below", "beneath" and "under" a second feature may indicate that the first feature is directly beneath or obliquely beneath the second feature, or may merely indicate that a horizontal height of the first feature is less than that of the second feature.

In the description of the disclosure, descriptions of reference terms such as "one embodiment", "some embodiments", "an example", "a specific example" or "some examples", etc., mean that specific features, structures, materials or characteristics described in combination with the embodiment/embodiments or example/examples are included in at least one embodiment or example of the present disclosure. In the disclosure, schematic expressions of the terms are not necessarily directed to the same embodiment or example. Moreover, the described features, structures, materials or characteristics can be combined in a suitable manner in any one or more embodiments or examples. In addition, in a situation in which no mutual conflict exists, one skilled in the art can unite and combine different embodiments or examples and features of different embodiments or examples described in the specification.

Although the embodiments of the present disclosure have been shown and described above, it should be understood that the above embodiments are exemplary and cannot be construed as limitation to the present disclosure. One of ordinary skill in the art can make changes, modifications, replacements and alternations to the above embodiments within the scope of the present disclosure.

The invention claimed is:

1. A method implemented by one or more computing devices, the method comprising:
   receiving an identity verification request sent from a client terminal of a user;
   determining a first communication number according to the identity verification request;
   generating a temporary communication number for the first communication number;
   recording the first communication number and the temporary communication number as first data;
   returning the temporary communication number to the client terminal;
   receiving a call request to the temporary communication number, the call request associated with a second communication number;
   determining the second communication number and the temporary communication number as second data;
   verifying that the first data matches with the second data; and
   selecting a content of a prompt audio message to be played according to a security level of an identity verification corresponding to the identity verification request, the selecting including:
     in response to determining that the security level of the identity verification is a first level, instructing to play a default prompt audio message and determining that the identity verification succeeds after the default prompt audio message is played;

in response to determining that the security level of the identity verification is a second level, instructing to press a corresponding key; and in response to determining that the security level of the identity verification is a third level, instructing to input a corresponding numerical string or character string.

2. The method of claim 1, further comprising:
returning a verification result.

3. The method of claim 1, further comprising:
determining whether a time difference between a time at which the call request is received and a time at which the first data is generated is less than a preset time; and
determining that the identity verification of the user fails in response to determining that the time difference is greater than or equal to the preset time.

4. The method of claim 1, further comprising determining that the identity verification fails in response to determining that the first data does not match with the second data.

5. The method of claim 1, further comprising:
receiving information inputted by the user according to the prompt audio message; and
verifying whether the inputted information is consistent with the content of the prompt audio message.

6. The method of claim 1, wherein: the identity verification request is received in response to an event of a registration of a new account by the user; and the identity verification request includes the first communication number that is inputted by the user.

7. The method of claim 1, wherein:
the identity verification request comprises account information of the user; and
the determining the first communication number comprises determining a corresponding communication number according to the account information of the user.

8. The method of claim 1, further comprising causing the client terminal to display the temporary communication number via a two-dimensional code, the two-dimensional code enabling the call request to the temporary communication number upon being scanned.

9. A server comprising:
one or more processors; and
memory storing computer-readable instructions that, when executed by the one or more processors, cause the one or more processors to perform acts comprising:
receiving an identity verification request from a first client terminal of a user;
determining a first communication number according to the identity verification request;
generating a temporary communication number for the first communication number;
recording the first communication number and the temporary communication number as first data;
returning the temporary communication number to the first client terminal;
receiving a call request to the temporary communication number from a second client terminal;
determining a second communication number corresponding to the call request and the temporary communication number as second data;
verifying that the first data matches with the second data; and
selecting a content of a prompt audio message to be played at the second client terminal according to a security level of an identity verification corresponding to the identity verification request, the selecting including:
in response to determining that the security level of the identity verification is a first level, instructing to play a default prompt audio message and determining that the identity verification succeeds after the default prompt audio message is played;
in response to determining that the security level of the identity verification is a second level, instructing to press a corresponding key; and
in response to determining that the security level of the identity verification is a third level, instructing to input a corresponding numerical string or character string.

10. The server of claim 9, wherein the acts further comprise receiving the identity verification request in response to an event of a registration of a new account by the user, the identity verification request including the first communication number that is inputted by the user during the registration.

11. The server of claim 9, wherein:
the identity verification request comprises account information of the user; and
the determining the first communication number according to the identity verification request comprises determining the first communication number based at least in part on the account information of the user.

12. The server of claim 9, wherein the acts further comprise:
determining whether a time difference between a time at which the call request is received and a time at which the first data is generated is less than a preset time; and
determining that the identity verification of the user fails in response to determining that the time difference is greater than or equal to the preset time.

13. The server of claim 9, wherein the acts further comprise determining that the identity verification of the user fails in response to determining that the first data does not match with the second data.

14. The server of claim 9, wherein the acts further comprise:
receiving information inputted by the user according to the prompt audio message from the second client terminal; and
determining whether the inputted information is consistent with the content of the prompt audio message.

15. The server of claim 9, wherein the acts further comprise returning the temporary communication number in a form of a two-dimensional code, the two-dimensional code initiating the call request to the temporary communication number upon being scanned.

16. The server of claim 9, wherein the first client terminal is the second client terminal.

17. The server of claim 9, wherein the first client terminal is different from the second client terminal.

18. One or more computer-readable media storing computer-readable instructions that, when executed by one or more processors, cause the one or more processors to perform acts comprising:
receiving an identity verification request sent from a client terminal of a user;
determining a first communication number according to the identity verification request;
generating a temporary communication number for the first communication number;

recording the first communication number and the temporary communication number as first data;
returning the temporary communication number to the client terminal;
receiving a call request to the temporary communication number, the call request associated with a second communication number;
determining the second communication number and the temporary communication number as second data;
verifying that the first data matches with the second data;
selecting a security level of an identity verification corresponding to the identity verification request, the selecting including:
in response to determining that the user is in a normal state, selecting a first level verification;
in response to determining that the user is in an abnormal state, selecting a second level verification; and
in response to determining that the user is flagged, selecting a third level verification; and
selecting a content of a prompt audio message to be played according to the security level of the identity verification.

19. The one or more computer-readable media of claim 18, wherein the acts further comprise:
returning a verification result.

20. The one or more computer-readable media of claim 18, the acts further comprising:
determining whether a time difference between a time at which the call request is received and a time at which the first data is generated is less than a preset time; and
determining that the identity verification of the user fails in response to determining that the time difference is greater than or equal to the preset time.

* * * * *